(No Model.)
C. A. ARMSTRONG.
ATTACHMENT FOR CULTIVATORS.
No. 463,933. Patented Nov. 24, 1891.
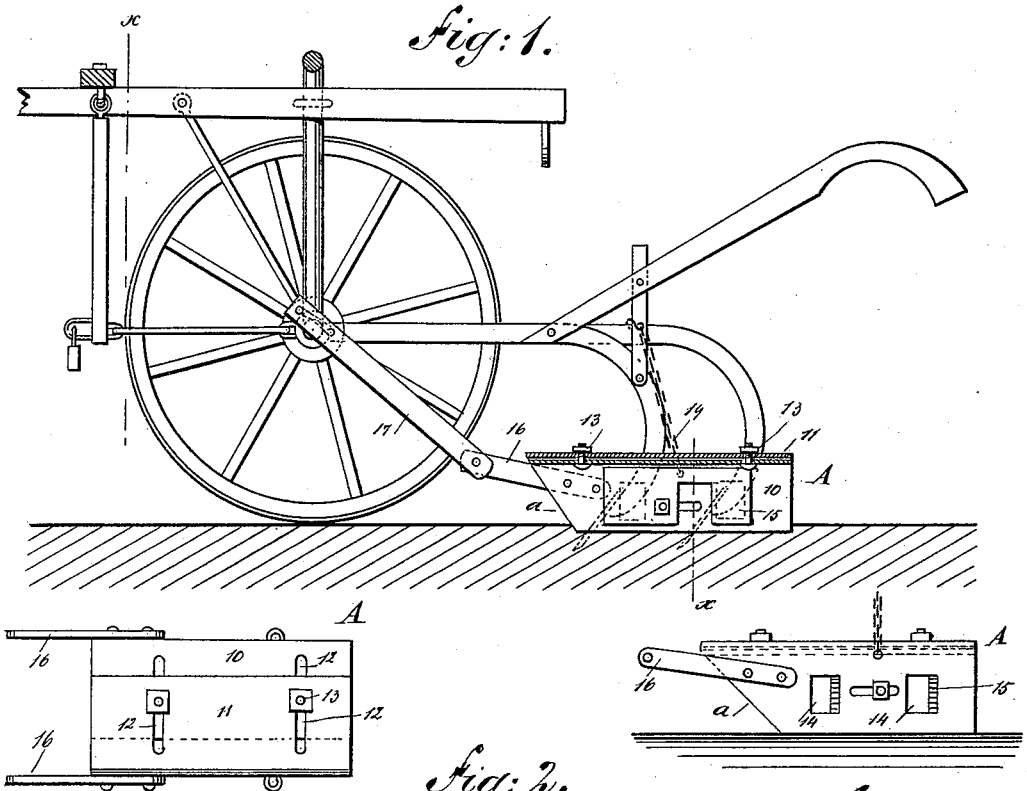
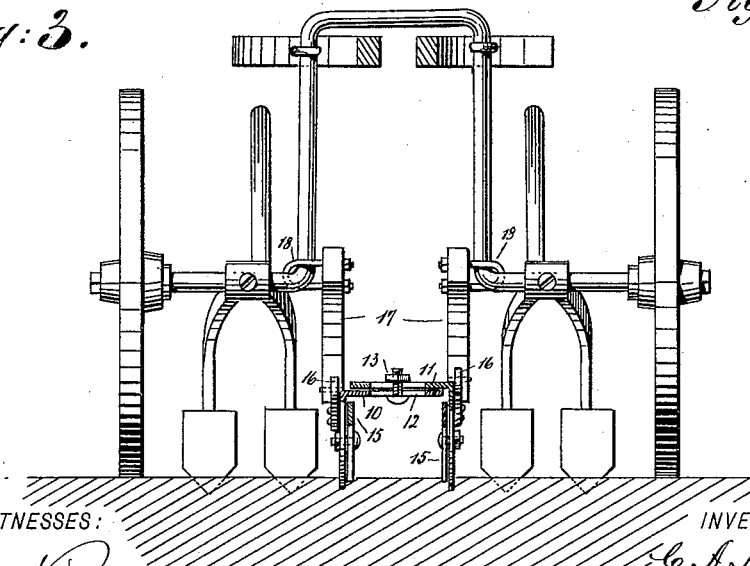
WITNESSES:
Chas. Nida.
C. Sedgwick
INVENTOR:
C. A. Armstrong
BY Munn & Co.
ATTORNEYS

UNITED STATES PATENT OFFICE.

CHARLES A. ARMSTRONG, OF PAWNEE ROCK, KANSAS.

ATTACHMENT FOR CULTIVATORS.

SPECIFICATION forming part of Letters Patent No. 463,933, dated November 24, 1891.

Application filed February 25, 1891. Serial No. 382,728. (No model.)

*To all whom it may concern:*

Be it known that I, CHARLES ARTHUR ARMSTRONG, of Pawnee Rock, in the county of Barton and State of Kansas, have invented a new and Improved Attachment for Cultivators, of which the following is a full, clear, and exact description.

My invention is an improvement in the class of removable fender attachments for cultivators, which serve to protect young plants while being cultivated by preventing dirt from being thrown upon them by the plows or teeth with which the cultivators are provided.

The invention consists in the novel construction and combination of the several parts, as will be hereinafter fully set forth, and pointed out in the claim.

Reference is to be had to the accompanying drawings, forming a part of this specification, in which similar figures of reference indicate corresponding parts in all the views.

Figure 1 is a side elevation of the cultivator, illustrating the attachment of the device thereto, the device being in longitudinal section. Fig. 2 is a section taken practically on the line $xx$ of Fig. 1. Fig. 3 is a plan view of the cover device detached from the cultivator, and Fig. 4 is a side elevation of said device.

The cover device A is constructed in two sections 10 and 11. The sections are angular in cross section, comprising a horizontal and a vertical member. The horizontal members of the sections overlap, and are provided with transverse slots 12, through which slots bolts 13 are passed, provided with suitable nuts, whereby the width of the device may be changed to suit the width of the rows of plants over which it is to pass.

The forward end of the device is preferably beveled downward and rearward, as illustrated at $a$ in Fig. 4, and in the vertical member of each section of the device openings 14 are produced, which openings may be closed, or partially so, by slides 15, located upon the inner faces of the members, as illustrated in Figs. 1 and 4.

At each side of the forward end of the device an arm 16 is secured, which arms are preferably given a slight upward inclination, and beams or bars 17 are pivotally attached to the arms. The said beams or bars are attached to the axle of the cultivator, as shown in Fig. 2, preferably through the medium of threaded staples 18, which are passed around the axle and through the beams, being held in position by suitable nuts.

Chains 19 are attached to opposite sides of the cover device at or near the center, which chains are carried upward and secured to the gangs of the cultivator, whereby when the plows are lifted from the ground the device will be carried upward also. The device is located between the sets of hoes, and, when the axle is an arched one, below the arch, as is clearly illustrated in Fig. 2.

It is evident that when the device is placed over a row of young plants to be cultivated the said plants will be prevented from becoming crushed by the earth thrown from the plows, and that the plows may safely be set much closer to the rows, and it is further evident that through the medium of the openings 14 and the slides 15 the amount of earth delivered by the plows to the plants may be regulated as desired.

Having thus described my invention, I claim as new and desire to secure by Letters Patent—

The combination, with the axle of a cultivator, of a cover device or protector for young plants, comprising two laterally-adjustable sections essentially L-shaped in cross-section, the vertical members whereof are provided with openings and slides adapted to close the same, arms projected from one end of the device, beams pivoted to the arms, removable clamps adapted to connect the beams with the axle of the cultivator, and a connection between the device and the gangs of the cultivator, as and for the purpose specified.

CHARLES A. ARMSTRONG.

Witnesses:
S. B. DENPRES,
A. D. BIXBY.